United States Patent [19]

Mäkimaa

[11] Patent Number: 5,229,930
[45] Date of Patent: Jul. 20, 1993

[54] WELDING INVERTER AND METHOD FOR CONTROLLING A WELDING INVERTER

[75] Inventor: Tapani Mäkimaa, Lahti, Finland
[73] Assignee: Kemppi Oy, Lahti, Finland
[21] Appl. No.: 828,201
[22] Filed: Jan. 30, 1992

[30] Foreign Application Priority Data

Feb. 25, 1991 [FI] Finland .................................. 910881

[51] Int. Cl.$^5$ .......................................... H02M 7/5387
[52] U.S. Cl. ........................................ 363/132; 363/98
[58] Field of Search ................... 363/17, 97, 98, 132, 363/136

[56] References Cited

U.S. PATENT DOCUMENTS

| | | | |
|---|---|---|---|
| 4,533,986 | 8/1985 | Jones . | |
| 4,679,129 | 7/1987 | Sakakibara et al. . | |
| 4,722,040 | 1/1988 | Ball | 363/17 |
| 4,763,239 | 8/1988 | Ball | 363/98 |
| 4,996,462 | 2/1991 | Krummel | 363/132 X |
| 5,001,621 | 3/1991 | Egawa | 363/132 |

FOREIGN PATENT DOCUMENTS 386330 8/1976 Sweden .

*Primary Examiner*—Emanuel T. Voeltz
*Attorney, Agent, or Firm*—Beveridge, DeGrandi, Weilacher & Young

[57] ABSTRACT

The present invention concerns a half-bridge inverter and a method for controlling such a welding inverter which has a nominal output power $P_n$ and a nominal operating angular frequency $\omega_t$, the inverter being comprised of a DC power source (E); of a capacitor configuration comprising at least one capacitor ($C_n$), the circuit being connected at its first end to one end of the DC power source (E) and at its other end to a point A; of two switching elements ($T_1$, $T_2$) connected in series over the DC power supply (E), the switching elements being capable of controlling the pulse width $\tau$ of the current to the welding load, and thus the power to the welding load, whereby $\tau_{max}$ determines the nominal power output of the inverter; and of a transformer primary ($L_p$) connected at its first end to point A and at its second end to the center point of the switching elements ($T_1$, $T_2$), and the current switched through the primary has a peak value $I_i$. At output power levels which exceed the critical output power $P_k$, the total capacitance $\Sigma C$ of the capacitor circuit ($C_n$) is smaller than the product of the current $I_i$ and the pulse width $\tau$ divided by the voltage E of the DC power source ($\Sigma C < (I_i \times \tau)/E$), and the resonant angular frequency $\omega_r$ ($= 1/\sqrt{L_p \Sigma C}$) determined by the total inductance $L_p$ of the transformer primary and the total capacitance of the capacitor configuration ($C_n$) is essentially lower than the operating angular frequency $\omega_t$ of the inverter.

10 Claims, 4 Drawing Sheets

WELDING INVERTER AND METHOD FOR CONTROLLING A WELDING INVERTER

FIELD OF THE INVENTION

The present invention relates to a welding inverter. As well as a method for controlling a welding inverter.

BACKGROUND OF THE INVENTION

In a conventional pulse-width modulated inverter, the center-tapping capacitors $C_n$ are dimensioned for a sufficiently large capacitance that permits only an insignificant voltage ripple of the center point A of the tapping circuit at the operating frequency of the inverter. The main transformer is dimensioned for maximum inductance of $L_p$, whereby its magnetization current remains small.

On the other hand, a conventional resonant inverter has the values of C and $L_p$ dimensioned so that the circuit sustains a large-amplitude resonance oscillation, whereby the peak-to-peak voltage at the center-tapping point A exceeds the voltage of the DC feed circuit.

Circuit configurations related to welding inverter techniques are described in, i.a., the following publications:

The U.S. Pat. No. 4,533,986 concerns a power supply for signal processing applications. The power supplies described are of the series resonant type.

The U.S. Pat. No. 4,679,129 describes an inverter configuration which uses series resonant power supplies.

The SE patent publication 386,330 describes an AC power source particularly for induction heating. The operating frequency of the power generator is determined by an external oscillator. The capacitors C5 and C6 of the circuit are dimensioned for resonance close to the operating frequency with the coil 7 acting as the load. The frequency of the oscillator 2 is adjustable to control the input power to the coil 7. The LC circuit is dimensioned to be approximately resonant at the operating frequency.

A crucial drawback of prior-art pulse-width modulated circuits has been associated with the cut-off behaviour of the switching elements at high current levels. If a transistor is used as the switching element, the matter is relatively insignificant at low current levels. However, the short-circuit currents occurring in welding at levels up to twice the nominal current pose problems during the cut-off phase in all inverter types.

SUMMARY OF THE INVENTION

It is an object of the present invention to overcome the drawbacks of the above described techniques and to achieve a novel type of welding inverter and a method for controlling said inverter.

The invention is based on the concept of dimensioning the total capacitance $\Sigma C$, which may comprise a single capacitor or several parallel-acting capacitors $C_1$, $C_2 \ldots$, in a half-bridge inverter so that at power levels exceeding a critical power level $P_k$ the charging equation fulfills particularly for a square wave the following criterion:

$$I_i \times \tau > \Sigma C \times E, \text{ where}$$

$I_i$ = peak value of current (typically square wave) passing through the primary of the transformer $L_p$, said peak value being dependent on the loading level, $\tau$ = "on" state duration of half cycle (that, is pulse width) of current $I_i$, E = total voltage (source voltage) over capacitors, and $P_n$ = inverter nominal output power, $E \times I_n/2$ $P_k$ = critical output power, $0 < P_k < P_n$, typically $P_k$ is about 15 ... 80% of $P_n$.

In addition, the resonant angular frequency of the inverter circuit according to the invention, which is determined by the components $L_p$ and $\Sigma C$, is significantly lower than the operating frequency of the inverter.

If a full-bridge inverter is used, its dimensioning can always be returned to that of a half-bridge inverter. Therefore, the present invention also covers full-bridge inverters by virtue of this computational possibility.

To elucidate the function of the invention, the following variables are defined:

$I_n$ = nominal value of inverter primary current;

$\omega_t$ = nominal angular operating frequency, and $(\omega_t = \pi/\tau_{max})$ $\tau_{max}$ = pulse width corresponding to the inverter nominal output power.

More specifically, the welding inverter and method of using the welding inverter according to the invention is characterized in that a critical output power $P_k$, which is smaller than the nominal output power $P_n$, is defined for the inverter. Moreover, for those output power levels of the inverter which exceed the critical output power $P_k$, the capacitor circuit ($C_n$) is dimensioned to fulfill the following criterion:

the total capacitance $\Sigma C$ of the capacitor circuit ($C_n$) is smaller than the product of the current $I_i$ and the pulse width $\tau$ divided by the voltage E of the DC power source ($\Sigma C < (I_i \times \tau)/E$).

In addition, the resonant angular frequency $\omega_t$ ($= 1/\sqrt{L_p \Sigma C}$) determined by the total inductance $L_p$ of the transformer primary and the total capacitance $\Sigma C$ of the capacitor circuit ($C_n$) is dimensioned to be essentially lower than the operating angular frequency $\omega_t$ of the inverter.

Also, at power levels above the critical output power $P_k$, the operating angular frequency $\omega_t$ is increased to increase the output power of the inverter.

The invention provides outstanding benefits.

The concept according to the invention brings an essential improvement to the handling of current cut-off conditions at high welding current levels. Therefore, the switching components which perform the cut-off can be dimensioned for significantly smaller cut-off currents than it is possible when using conventional techniques.

BRIEF DESCRIPTION OF THE DRAWINGS

The invention is next examined in greater detail with the help of exemplifying embodiments illustrated in the attached drawings, in which.

DETAILED DESCRIPTION

The nominal output power $P_n$ of the welding inverter is defined according to the output power capability needed in practical work, and consequently the nominal output power is chosen approximately equal to the maximum output power capability. For reasons related to heat transfer, the inverter cannot in general, however, deliver the full nominal output power, but rather, the duty ratio (allowed working time divided by total operating time) in practice varies in the range of 30 ... 60%.

Respectively, the primary current $I_i$ of the inverter varies in the range 2 ... 150% of the nominal primary current $I_n$, depending on the instantaneous output power need and pulse ratio employed.

Figure 1:
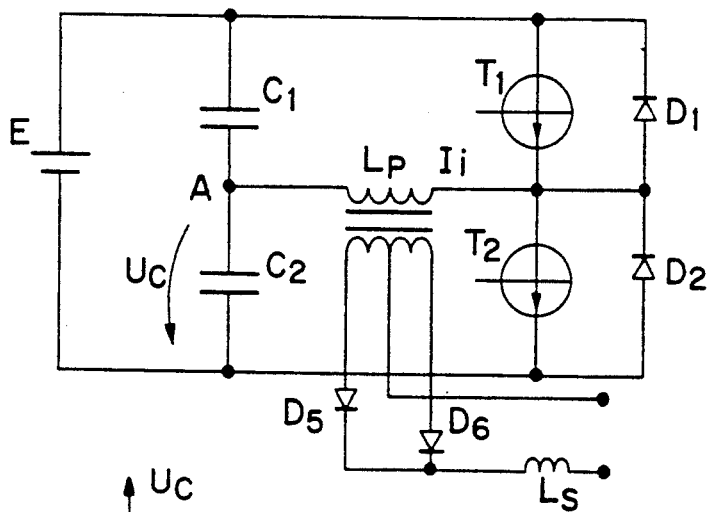
FIG. 1 shows diagrammatically the circuit configuration for a welding inverter according to the invention.

The welding inverter according to the invention, which is illustrated in FIG. 1, operates at a nominal angular frequency designated with $\omega_t$. The inverter comprises a DC power source E which has connected over it a center-tapping configuration comprised of at least two capacitors $C_1$, $C_2$, whereby a center point A in the center-tapping circuit can be defined, since the capacitances of the Center-tapping components $C_1$, $C_2$ connected to both sides of the center point A are approximately equal. Over the DC power source are further connected two switching elements $T_1$, $T_2$ in series, whose function is to control the primary current pulse width $\tau$, and thus the output power, whereby $\tau_{max}$ determines the nominal output power available from the inverter. Between the center point of the center-tapping circuit $C_1$, $C_2$ and the center point of the switching elements $T_1$, $T_2$ is connected a primary $L_p$ of a transformer, in which the peak value of the primary current is designated with $I_i$. According to the invention the total capacitance $\Sigma C$ of the center-tapping components $C_1$, $C_2$ fulfills at power levels above the critical output power $P_k$ the following criterion;

$$\Sigma C < (I_i \times \tau)/E.$$

The magnitude of the critical output power $P_k$ varies according to the application, however, so that the critical output power is fixed for a certain equipment size. If the inverter operates at a constant frequency, the critical output power $P_k$ is only slightly, by approx. 10 ... 20%, smaller than the nominal output power $P_n$. In applications operating at a variable frequency the value of $P_k$ is dimensioned considerably smaller, typically by approx. 40 ... 60% smaller than the nominal output power $P_n$.

The total capacitance $\Sigma C$ is advantageously smaller by at least 20% than the ratio in the equation above. Furthermore, the resonant angular frequency $\omega_r$ ($=1/\sqrt{L_p \Sigma C}$) determined by the total inductance $L_p$ of the transformer primary and the total capacitance $\Sigma C$ of the center tapping circuit $C_1$, $C_2$ is essentially lower than the operating angular frequency $\omega_t$ of the inverter, being e.g. lower than 1/5 of inverter operating angular frequency $\omega_t$. Reverse-biased diodes $D_1$ and $D_2$ are additionally connected in parallel with the switching elements $T_1$ and $T_2$. The diodes are not absolutely essential for the function of the circuit according to the invention. Due to the nonideal behaviour of the transistors, however, the diodes are employed. In some transistor types the diodes are integral with the transistor chip itself. Strictly defined, the total capacitance $\Sigma C$ is the total capacitance connected to the point A, whereby the capacitors $C_1$ and $C_2$ act functionally in parallel. The transformer secondary is wound center-tapped, whereby one load terminal is connected to the center tap of the secondary. The other terminal of the load is connected to the outer ends of the secondary via diodes $D_5$ and $D_6$ as shown in the diagram, whereby the load is fed with a full-wave rectified voltage that further is filtered with the help of a smoothing inductor $L_5$.

Figure 2A:
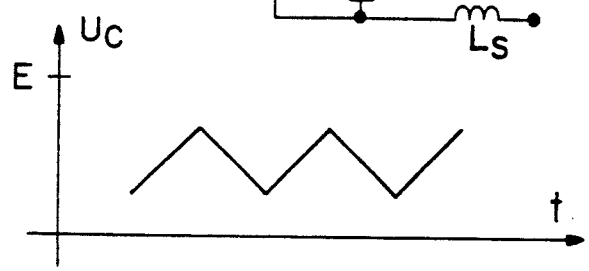
FIG. 2a shows in a graph the voltage-time relationship for the voltage over the center-tapping capacitor C at low welding current levels in a welding inverter according to the invention.
Figure 2B:
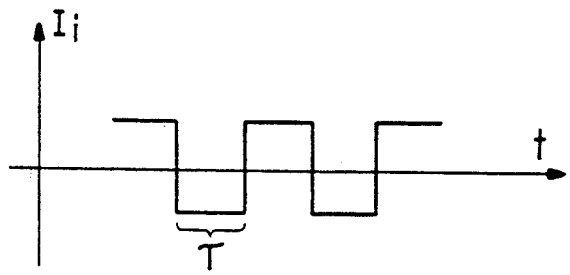
FIG. 2b shows in a graph the current-time relationship for the transformer primary current at low welding current levels in a welding inverter according to the invention.
Figure 3A:
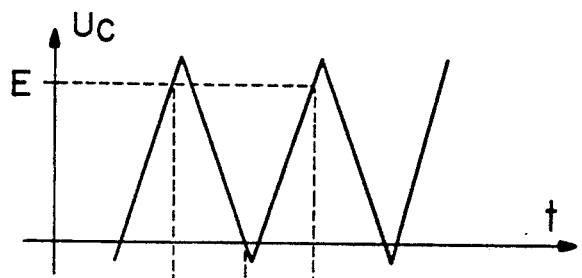
FIG. 3a shows in a graph the voltage-time relationship for the voltage over the center-tapping capacitor C at high welding current levels in a welding inverter according to the invention.
Figure 3B:
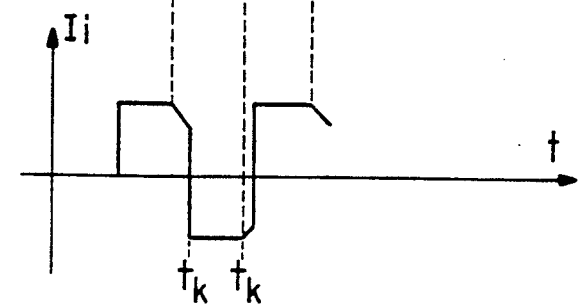
FIG. 3b shows in a graph the current-time relationship for the transformer primary current at high welding current levels in a welding inverter according to the invention.

As illustrated in FIGS. 2 and 3, the function of the inverter circuit according tot he invention is as follows:

At low power levels, the circuit operates in the conventional manner, and the voltage at the point A does not fluctuate essentially. When the current $I_i$ is increased, the voltage over the capacitors $C_n$ begins to fluctuate with a greater amplitude as shown in FIG. 2a. Correspondingly, the current $I_i$ varies as shown in FIG. 2b. With a further increase in the current $I_i$, a situation illustrated in FIG. 3b is finally attained in which the peak values of the voltage $U_C$ exceed the power source voltage E (FIG. 3a). When $U_C$ exceeds the power source voltage in the manner shown in FIG. 3a, the value of the current $I_i$ starts falling in the manner shown in FIG. 3b just prior to the cut-off instant $t_k$. Consequently, at the cut-off instant $t_k$, the current through the transistor $T_n$ is essentially smaller than the peak value of the current. In addition to this, the current via the stray inductance of the transformer falls very rapidly, because the voltage over the transformer primary may even be reversed at the cut-off instant. By virtue of the resonance principle, the cut-off situation over the switching elements is noncritical. Thus, the switching elements themselves do not need auxiliary circuits to augment the cut-off process. In practice, always when the current $I_i$ in the case illustrated in FIG. 3b approaches the zero-crossing point, a dead time occurs during which the current $I_i$ is zero or at least very close to zero. If this time would be depicted in the diagram illustrated in FIG. 3b, the dead time would appear as a short threshold period of essentially zero current, drawn parallel to the t-axis, adjacent to $t_k$. The duration of the dead time for full pulse duty cycle is approx. 0.5 ... 3 μs.

The values of components and nominal design parameters for an exemplifying case could be as follows:

| | Design range | Exemplifying value |
|---|---|---|
| $\Sigma C =$ | $0.1 \ldots 10\ \mu F$ | $1\ \mu F$ |
| $L_p =$ | $0.5 \ldots 20$ mH | 2 mH |
| $I_i =$ | $0 \ldots 200$ A | 35 A |
| $E =$ | $200 \ldots 900$ V | 500 V |
| $\omega_t =$ | $3 \times 10^4 \ldots 6 \times 10^5$ 1/s | $10^5$ 1/s |
| $\tau =$ | $5 \ldots 200\ \mu s$ | 25 μs |
| $I_n =$ | $5 \ldots 100$ A | 40 A |
| $\tau_{max} =$ | $\pi/\omega_t$ | 31 μs |
| $P_n =$ | $500$ W $\ldots 50$ kW | 8 kW |
| $P_k =$ | $(15 \ldots 80\%) \times P_n$ | $50\% \times P_n$ |

When the current illustrated in the graph of FIG. 3 reaches a state in which $I_i$ is at the cut-off instant only a small fraction (e.g. 10 ... 30%) of the peak current during the operating cycle, the output power from the circuit starts to droop at increased load. This drawback can be avoided by increasing the operating frequency so that the output power is boosted at increased load, yet maintaining the condition that the cut-off takes place at an essentially low current. Advantageously, the increase in operating frequency is accomplished when the inverter output power has already marginally exceeded the critical output power level $P_k$. Thereby, the design criterion based on the charging equation achieves an advantageous cut-off over a wide range of output power. This arrangement approaches the resonant cut-off scheme, and in some occasion, it is even advantageous to overgo to purely resonant cut-off in which the current passes most of the time via the diodes $D_1$ and $D_2$ as is the case in a conventional resonance-type inverter, whereby no cut-off losses occur in the power switch element.

The concept of frequency change can be utilized in the dimensioning of the circuit, e.g., as follows:

The following design rules are assumed:

Charging equation:

$$C \times E = \tau \times I_i$$

In practical design based on nonideal components it has been found that the dimensioning rule for the capacitor C can be formulated as:

$$I_i = k \times \frac{C \times E}{\tau}$$

where $k = 0.7 \ldots 0.8$

This method of dimensioning achieves the goal that extremely low cut-off losses be attained close to the critical output power level $P_k$. If the critical output power $P_k$ has been chosen high, actually close to the nominal output power $P_n$, an advantageous cut-off situation is achieved only at high values of $\tau$, which means high load voltages at current levels close to the nominal output current and above. Because the output voltage is proportional to the relative pulse width, that is, the ratio $\tau/T$, a rather disadvantageous cut-off situation results at low load voltages. This drawback can be diminished by changing the operating frequency in the following manner:

Solving the equation of limit criteria for the current $I_i$ yields the equation:

$$I_i = k \times \frac{C \times E}{\tau}$$

As is evident, the advantageous maximum current in practical design depends on the source voltage E, capacitor C and instantaneous pulse width. The design parameters C and E are difficult to alter after the equipment is built, because the output voltage to the load depends on the value of E as follows:

$$U_L = \frac{1}{n} \times \frac{2 \times \tau}{T} \times E$$

where n = transformer turns ratio

Obviously, the nominal primary current of the inverter power supply can be increased by reducing the pulse length $\tau$. In order to maintain the output voltage at a constant level, the operating frequency must be increased proportionally.

Thus, the practical rules of dimensioning can be described as follows:

The smallest operating angular frequency of the apparatus is selected as an angular frequency which yet fulfills other design criteria (e.g. sound level, current ripple). The critical output power $P_k$ is set as half the desired nominal output power. This approach gives an extremely advantageous cut-off situation when the apparatus is loaded at approximately half the nominal output current. If the apparatus is to deliver a higher output current than half of said nominal current, the operating frequency is increased correspondingly so that the desired output power is supplied yet retaining the advantageous cut-off situation, because the circuit operates above the critical output power $P_k$.

Figure 4A:
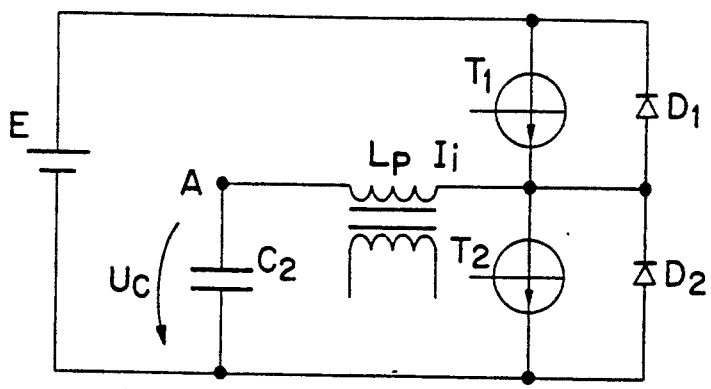
FIG. 4a shows diagrammatically the circuit configuration for another embodiment of the welding inverter according to the invention.
Figure 4B:
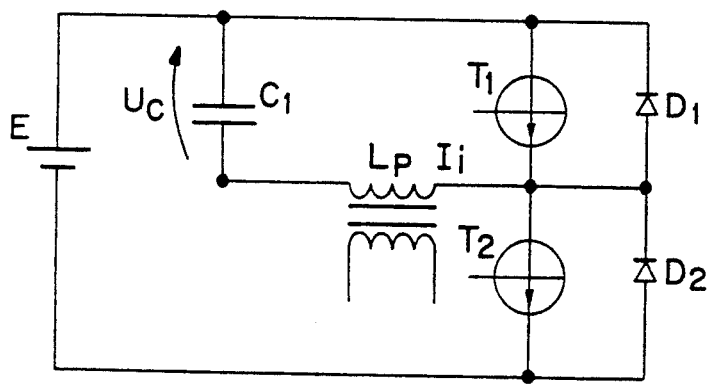
FIG. 4b shows diagrammatically the circuit configuration for a third embodiment of the welding inverter according to the invention.

FIGS. 4a and 4b illustrate alternative configurations of the circuit according to the invention that are equivalent to the circuit shown in FIG. 1 except with the omission of the second capacitor. If one of the capacitors is omitted, the capacitance of the remaining capacitor $C_n$ must be equal to the sum of capacitances $C_1$ and $C_2$.

Figure 5:
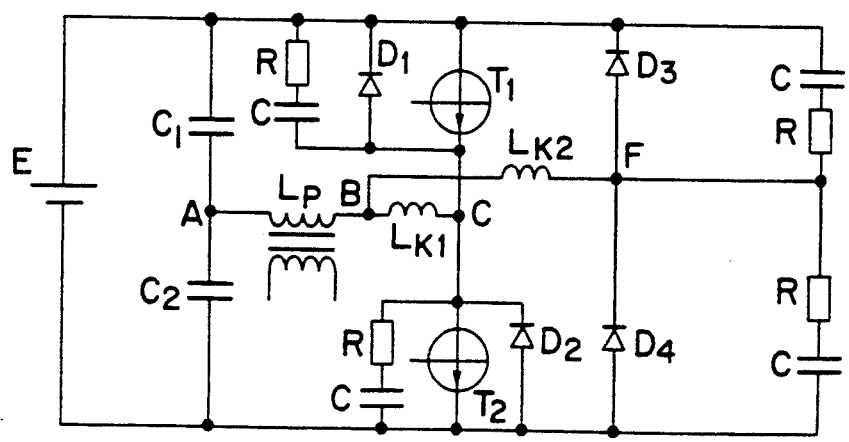
FIG. 5 shows diagrammatically the circuit configuration for a fourth embodiment of the welding inverter according to the invention.

The embodiment shown in FIG. 5 is an enhanced version of the circuit illustrated in FIG. 1. The circuit is provided saturable inductors $L_{k1}$ and $L_{k2}$ placed between the input B of the transformer primary $L_p$ and the center point C adjoining the turn-off controllable switching elements, transistors $T_1$ and $T_2$ in particular, as well as between the point B and the center point F adjoining the diodes $D_3$ and $D_4$, whereby the inductors are advantageously dimensioned so that the duration of saturation in the inductor placed between the points B and C substantially exceeds the duration of saturation in the saturable inductor placed between the points B and F. As necessary, an RC snubber circuit is connected in parallel with each diode $D_1$, $D_2$, $D_3$, $D_4$.

In the circuit configuration illustrated in FIG. 5, the resonance principle utilized causes at high power levels a situation in which the current passing via the freewheeling diode $D_1$ must be transferred to the transistor $T_2$, and correspondingly, the current passing via $D_2$ to the transistor $T_1$.

Even if a fast-switching diode, the reverse current transient via the diode stresses both the diode itself and the transistor overtaking the diode current in the cut-off situation, whereby the transistor has to function outside the limits of safe operation. This drawback is circumvented by way of the saturable inductors $L_{k1}$ and $L_{k2}$ of the circuit shown in FIG. 5. If the duration of saturation in $L_{k1}$ is dimensioned to be substantially longer than that of $L_{k2}$, the return current of the resonant voltage swing does not pass in any appreciable amount via said transistor branch, but rather, via $L_{k2}$ to the diodes $D_3$ and $D_4$. Now, if one of the transistors is driven conductive before the current in the diode branch has fallen to zero, $L_{k1}$ acts as an auxiliary commutation circuit for the transistor switch and $L_{k2}$ limits the rate of change $dI/dt$ in the commutation of the diode branch to a safe value. If the diode branch is additionally provided with a moderate RC snubber circuit, the cut-off losses in the diode branch remain extremely low.

Figure 6:
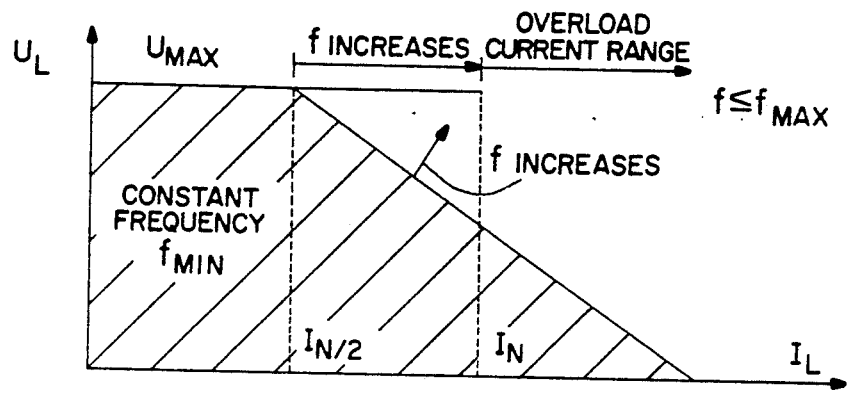
FIG. 6 shows in a graph the control method for the welding inverter according to the invention.

When operating the inverter as shown in FIG. 6 with load currents $I_L$ which remain approximately smaller than half the nominal load current of the inverter and the load voltage is anywhere between zero and the maximum output voltage of the inverter, the operation takes place at the minimum operating frequency defined by the inverter design. When the load current reaches approximately half the nominal output current and the load voltage is at the nominal level, the cut-off current via the switching element starts to decrease. If the load is increased in this situation and the frequency would be held constant, the output voltage would drop. Therefore, with an increasing load, the operating frequency is increased in the case the output voltage is to be held constant. By contrast, if the output voltage requirement presumed by the loading situation is met without frequency increase, the driver circuitry operates at constant frequency, so the frequency change is based on demand only.

Figure 7:
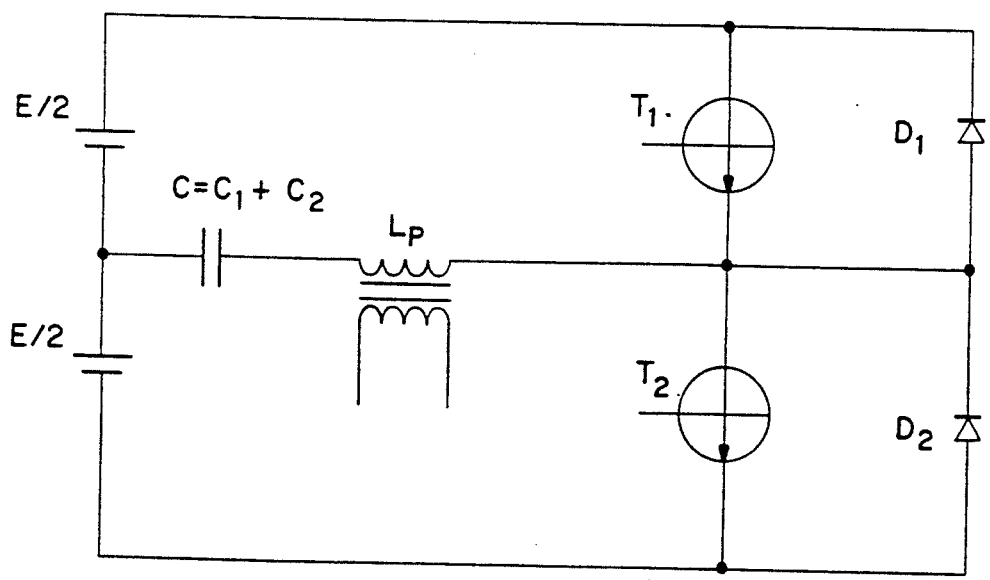
FIG. 7 shows a circuit configuration which is electrically and functionally equivalent to that illustrated in FIG. 1.

According to FIG. 7, the circuit configuration shown in FIG. 1 can be drawn so that the summed capacitance of the capacitors $C_1$ and $C_2$ is placed between the transformer primary $L_p$ and the center point formed by the split power source $E/2$. This circuit configuration is electrically and functionally equivalent to that illustrated in FIG. 1. Both circuit configurations shown in FIGS. 1 and 7 are known in the art as half-bridge inverters.

Figure 8:
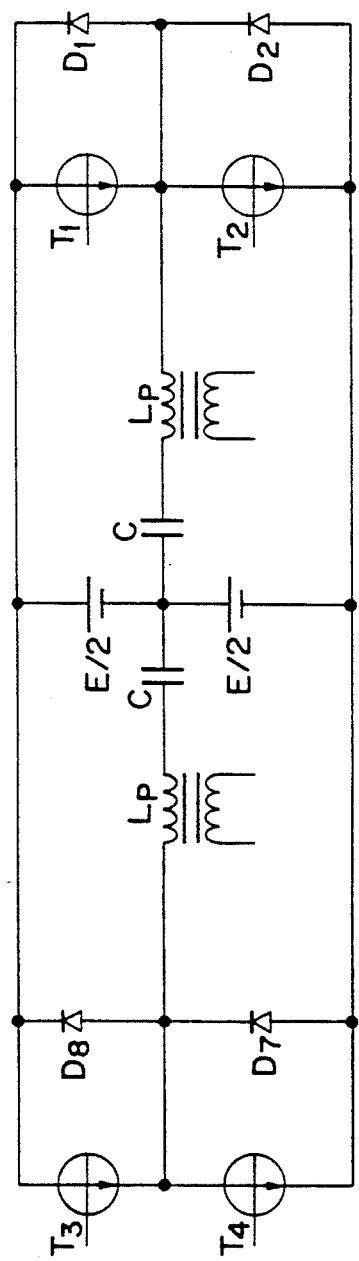
FIG. 8 shows the combination of two circuits according to the invention into a full-bridge circuit.

According to FIG. 8, a full-bridge inverter is formed by parallelling two half-bridge inverters shown in FIG. 7. Such a circuit configuration is rare but well illustrative of the design method in which a full-bridge inverter is formed from half-bridge inverters.

Figure 9:
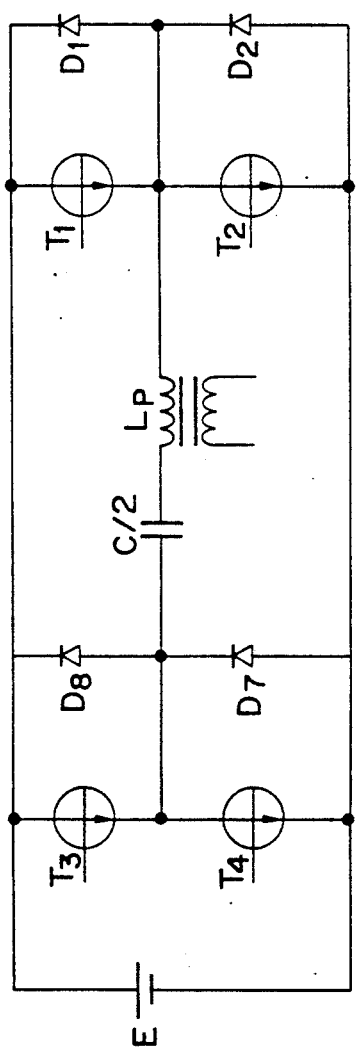
FIG. 9 shows a circuit configuration which is electrically and functionally equivalent to that illustrated in FIG. 8.

FIG. 9 shows the circuit configuration of a practical full-bridge inverter in which the components $T_3$, $T_4$, $D_6$ and $D_7$ in the left-side branch to their specifications correspond to the components of the right-side branch. The circuit configuration illustrated in FIG. 8 is here reduced to a simplified form by combining the capacitors C into a single capacitor $C/2$ and the power sources $E/2$ into a single power source E. The output power capability of such an inverter is double that of a single half-bridge inverted implemented using same component and voltage values. Therefore, in order to determine the proper form of the design criterion according to the invention, the full-bridge inverter must either be divided into two half-bridge inverters both of which designed for half the desired output power capability, or alternatively, the charging equation of the full-bridge inverter must be written as:

$$2 \times E \times \Sigma C = I \times \tau$$

Obviously, such a full-bridge inverter can be any time reduced back to a circuit configuration comprising two half-bridge inverter circuits illustrated in either FIG. 1 or 7, whereby the design criterion according to the invention is easy to determine.

Figure 10:
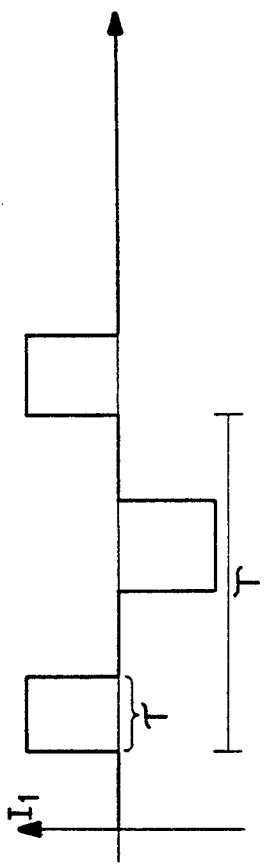
FIG. 10 shows in a graph the current-time relationship for the transformer primary current at a partial load level in a welding inverter according to the invention.

As illustrated in FIG. 10, partial loads are handled using a small pulse duty ratio $\tau/T$, whereby the dead time between the pulses becomes relatively long.

What is claimed is:

1. A half-bridge inverter or a circuit configuration modelled as a half-bridge inverter from a full-bridge inverter by computational halving methods, said inverter having a nominal output power $P_n$ and a nominal operating angular frequency $\omega_t$, said inverter comprising a DC power source (E), two switching elements ($T_1$, $T_2$) connected in series over said DC power source (E), said switching elements being capable of controlling the pulse width $\tau$ of the current to a welding load, and thus the power to the welding load, whereby $\tau_{max}$ determines the nominal power output of the inverter, a transformer primary ($L_p$) connected at a first end to the center point of said switching elements ($T_1$, $T_2$), whereby the current switched through said primary has a peak value $I_i$ with a waveform which typically is a square wave, a capacitor circuit comprised of at least one capacitor ($C_n$), said circuit being connected at a first end to an end of the transformer primary ($L_p$) which is not connected to said switching elements ($T_1$, $T_2$) and further being connected at a second end directly to one end of said DC power source (E), and reverse-biased diodes (D1, D2) are connected in parallel with said switching elements ($T_1$, $T_2$), characterized in that said inverter designed for a critical output power $P_k$, which is smaller than the nominal output power $P_n$, for those output power levels of the inverter which exceed said critical output power $P_k$, the capacitor circuit ($C_n$) fulfills the following design criterion:

the total capacitance $\Sigma C$ of the capacitor circuit ($C_n$) is smaller than the product of the current $I_i$ and the pulse width $\tau$ divided by the voltage E of the DC power source ($\Sigma C < (I_i \times \tau)/E \times N$), and the resonant angular frequency $\omega_r$ ($= 1/\sqrt{L_p \Sigma C}$) determined by the total inductance L of the transformer primary and the total capacitance $\Sigma C$ of the capacitor circuit ($C_n$) is essentially lower than the operating angular frequency $\omega_t$ of the inverter.

2. A half-bridge inverter as defined in claim 1, said inverter having a nominal output power $P_n$ and a nominal operating angular frequency $\omega_t$, said inverter comprising a DC power source (E), a capacitor circuit comprised of at least one capacitor ($C_n$), said circuit being connected at a first end to one end of said DC power source (E) and at a second end to a point A, and two switching elements ($T_1$, $T_2$) connected in series over said DC power supply (E), said switching elements being capable of controlling the pulse width $\tau$ of the current to the welding load, and thus the power to the welding load, whereby $\tau_{max}$ determines the nominal power output of the inverter, reverse-biased diodes ($D_1$, $D_2$) connected in parallel with said switching elements ($T_1$, $T_2$), and a transformer primary ($L_p$) connected at a first end to said point A and at a second end to the center point of said switching through said primary has a peak value $I_i$ with a waveform which typically is a square wave, characterized in that said capacitor circuit is comprised of a center-tapping configuration comprising at least two capacitors ($C_1$, $C_2$), said configuration being connected over said DC power source (E), whereby a center point (A) can be defined in the center-tapping circuit as the capacitances of the center-tapping components ($C_1$, $C_2$) connected to both sides of said center point are approximately equal.

3. A half-bridge inverter as defined in claim 1, characterized in that said critical output power $P_k$ is 15 ... 80% of said nominal output power $P_n$.

4. A half-bridge inverter as defined in claim 1, characterized in that the resonant angular frequency $\omega_r$ ($=1/\sqrt{L_p\Sigma C}$) determined by the total inductance $L_p$ of the transformer primary and the total capacitance $\Sigma C$ of the center-tapping configuration ($C_1$, $C_2$) is lower than 1/5 of the operating angular frequency $\omega_t$ of the inverter.

5. A half-bridge inverter as defined in claim 1, characterized in that said inverter has means for increasing the operating angular frequency, and thus the available output power, when the power to the load exceeds a critical output power $P_k$, whereby the cut-off of said switching elements ($T_1 T_2$) occurs at low current.

6. A method for controlling such as inverter which has a nominal output power $P_n$ and a nominal operating angular frequency $\omega_t$, said inverter being comprised of a DC power source (E); of a capacitor circuit comprising at least one capacitor ($C_n$), said circuit being connected at a first end to one end of said DC power source (E) and at a second end to a point A; of two switching elements ($T_1$, $T_2$) connected in series over said DC power supply (E), said switching elements being capable of controlling the pulse width $\tau$ of the current to a welding load, and thus the power to the welding load, whereby $\tau_{max}$ determines the nominal power output of the inverter; of reverse-biased diodes ($D_1$, $D_2$) connected in parallel with said switching elements ($T_1$, $T_2$); and of a transformer primary ($L_p$) connected at a first end to said point A and at a second end to the center point of said switching elements ($T_1$, $T_2$), whereby the current switched through said primary has a peak value $I_i$, in which method the pulse width $\tau$ and the operating angular frequency $\omega_t$ are varied in order to control the welding power, characterized in that a critical power output $P_k$ which is smaller than the nominal output power $P_n$ is defined for said inverter, for those output power levels of the inverter which exceed said critical output power $P_k$, the capacitor circuit ($C_n$) is dimensioned to fulfill the following criterion:

the total capacitance $\Sigma C$ of the capacitor circuit ($C_n$) is smaller than the product of the current $I_i$ and the pulse width $\tau$ divided by the voltage E of the DC power source ($\Sigma C < (I_i \times \tau)/E$), the resonant angular frequency $\omega_r$ ($=1/\sqrt{L_p\Sigma C}$) determined by the total inductance Lp of the transformer primary and the total capacitance $\Sigma C$ of the capacitor circuit ($C_n$) are dimensioned to be essentially lower than the operating angular frequency $\omega_t$ of the inverter, and at power levels above said critical output power $P_k$ said operating angular frequency $\omega_t$ is increased to increase the output power of the inverter.

7. A method as defined in claim 6, characterized in that said critical output power $P_k$ is defined as half the nominal output power $P_n$ of the inverter.

8. A half-bridge inverter as defined in claim 2, characterized in that said critical output power $P_k$ is 15 to 80% of said normal output power $P_n$.

9. A half-bridge inverter as defined in claim 8 characterized in that said critical output power $P_k$ is 50% of said normal output power $P_n$.

10. A half-bridge inverter as defined in claim 3, characterized in that said critical output power $P_k$ is 50% of said normal output power $P_n$.

* * * * *